United States Patent Office 3,471,449
Patented Oct. 7, 1969

3,471,449
PREPARATION OF HIGH MOLECULAR WEIGHT AMINES CONTAINING URETHANE AND UREA GROUPS
Wolfgang Heydkamp, Leverkusen, Otto Bayer, Burscheid, and Erwin Muller, Leverkusen, Germany, assignors to Farbenfabriken Bayer Aktiengesellschaft, Leverkusen, Germany, a corporation of Germany
No Drawing. Filed Nov. 17, 1966, Ser. No. 594,991
Claims priority, application Germany, Nov. 19, 1965, F 47,714
Int. Cl. C08g 22/02, 22/00
U.S. Cl. 260—77.5                                  6 Claims

ABSTRACT OF THE DISCLOSURE

High molecular weight amines having the formula

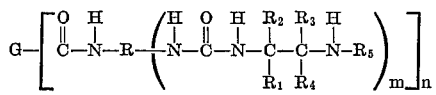

wherein G is the residue remaining after removing the hydrogen atoms from the hydroxyl groups of a monohydric or polyhydric alcohol, $n$ is equal to the number of hydrogen atoms removed from the hydroxyl groups of G and is therefore the valence of G, R is the residue remaining after the removal of at least two isocyanato groups from an organic polyisocyanate, $m$ is equal to the number of isocyanate groups removed from R and is therefore the valence of R, $R_1$, $R_2$, $R_3$ and $R_4$ are hydrogen, alkyl, phenyl or aralkyl, and $R_5$ is hydrogen, a monovalent organic radical or a radical having the formula

where $R_6$ has the same meaning as $R_5$. These compositions are useful in the preparation of elastomers by the isocyanate polyaddition process.

---

This invention relates to high molecular weight amines and to a method of preparing same. More particularly, it relates to high molecular weight amines containing urethane and urea groups.

It is known that high molecular weight aromatic diamines which contain urethane groups in the molecule in addition to the amino groups, can be obtained by reacting polymerization or polycondensation products which carry hydroxyl end groups with, for example, nitroarylisocyanates, followed by reduction to the amine, as for example in U.S. Patent No. 2,888,439. These same compounds can be obtained by reacting polymerization or polycondensation products having terminal hydroxyl groups with azoarylisocyanates with a subsequent reduction by catalytic means. Another process for obtaining this class of compounds is by reacting polymerization or polycondensation products containing hydroxyl groups with diisocyanates and then with secondary or tertiary carbinols. The carbamic acid esters obtained are then decomposed catalytically by the use of acids.

A process for preparing diamines which contain both urethane groups and urea groups in the molecule is described in German Patent No. 1,138,220. In this process, known polycondensation products containing terminal OH groups, are reacted with diisocyanates in a first reaction stage to produce so-called prelengthened diisocyanates. These are reacted with special short-chained diamines in organic solvents at low temperatures, for example at —20° C. This process is, however, limited to a few special amines since the two amino groups of these short-chained diamines must differ very greatly in their basicity or alternatively one amine group must be shielded by particularly bulky substituents in the immediate vicinity of the NH function (steric influence-steric hindrance) in order that only one amino group of the diamine may react with the isocyanate. Evan at low temperatures, the isocyanate groups react at least partly with both types of NH functions of the diamine. Consequently, chain-lengthening reactions and possibly even chain-branching reactions occur. This process can therefore only be used to a very limited extent and in addition, instead of giving uniform, clearly defined products, it leads to a process for the preparation of clearly defined high molecular weight amines which contain in addition urethane and urea groups.

It is therefore an object of this invention to provide improved high molecular weight amines. It is another object of this invention to provide an improved method of making high molecular weight amines. It is a further object of this invention to provide high molecular amines containing urea and urethane groups. It is still another object of this invention to provide an improved method of preparing high molecular weight amines which have either terminal preliminary or secondary amino groups.

The foregoing objects and others which will become apparent from the following description are accomplished in accordance with the invention generally speaking by providing high molecular weight amines having the general formula

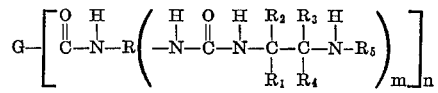

wherein G is the residue remaining after removing the hydrogen atoms from the hydroxyl groups of a monohydric or polyhydric alcohol, $n$ is equal to the number of hydrogen atoms removed from the hydroxyl groups of G and is therefore the valence of G, R is the residue remaining after the removal of at least two isocyanato groups from an organic polyisocyanate, $m$ is equal to the number of isocyanate groups removed from R and is therefore the valence of R; $R_1$, $R_2$, $R_3$ and $R_4$ are hydrogen, alkyl, phenyl or aralkyl, and $R_5$ is hydrogen, a monovalent organic radical or a radical having the formula

where $R_6$ has the same meaning as $R_5$. The compositions in accordance with this invention are prepared by reacting an NCO containing polymeric compound prepared by reacting a polyhydric alcohol with an excess of an organic polyisocyanate with a 1,2-alkylene imine. This product is then subsequently reacted with at least an equivalent quantity of ammonia, a low molecular weight amine or a hydrazine. It is preferred that the quantity of ammonia, amine or hydrazine be in large excess with respect to the quantity of the polymeric material containing ethylene imine groups.

In accordance with the general formula set forth above, G is the residue remaining after removal of the hydroxyl groups from the molecule. This is accomplished by reaction with an excess of an organic polyisocyanate.

Any suitable compounds containing two or more OH groups in the molecule may be used in reaction with an excess of an organic polyisocyanate such as, for example, di- or polyols such as ethylene glycol, propylene glycol, butanediols, hexanediols, octadecane - 9,10-diol-(1,12), thiodiglycol, 2,2-dimethyl-propanediol-(1,3), octadecanediol, 2- ethylhexynediol-(1,3), 2,4-dimethyl-2-propylheptane diol-(1,3), butene- or butinediol-(1,4), diethylene glycol, triethylene glycol, glycerol, hexanetriol-(1,2,6), pentaerythritol, quinitol, hexahydropyrocatechol and 4,4'-dihydroxy-dicyclohexyl-dimethylmethane; polyvalent phenols such as o-, m- or p-dihydroxybenzene, trihydroxybenzenes, 4,4'-dihydroxydiphenyl, 6,6'-dihydroxy-3,3'-diethyldiphenyl, 2,2'- or 4, 4'-dihydroxydibenzyl, 4, 4'-dihydroxydiphenyldimethylmethane, dihydroxydiphenylmethane, 4, 4' - dihydroxydiphenyl-1,1-isobutane, polymethylene-bisphenols of the type

in which n can be any integer from 1 to 18, trinuclear bisphenol, the nuclei of which are linked together by $CH_2$—$CH_2$ groups, hydroquinone ethylene diethers, dihydroxybenzophenones of the general formula

diphenol sulphides of the general formula

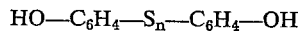

in which n may be any integer up to 3 and the benzene nuclei may be substituted, and 4,4'-dihydroxy-diphenyl sulphone.

It is particularly advantageous to use poly-functional hydroxy compounds of the type that are obtained by the addition of alkylene oxides to the above polyols or amines or by polymerization of alkylene oxides, including tetrahydrofuran. One or more mols of an alkylene oxide can be added. It is, of course, also possible to use mixtures of alkylene oxides for the reactions. By this method there are obtained, for example, linear or branched polyethylene-, polypropylene- or polybutylene glycol ethers.

The following are further examples of compounds containing several hydroxyl groups:

Polyacetals containing hydroxyl groups, such as those described in German patent specifications 1,039,744 and 1,045,095 or which may be obtained in known manner by condensation of thiodiglycol and its derivatives with themselves or with other polyhydric alcohols which are free from sulphur.

In addition to those hydroxyl containing compounds set forth above, any of those set forth in U.S. Patent No. 3,230,185 may be used.

It is preferable to use hydroxyl-containing compounds which have a molecular weight between 400 and 6000.

In addition to the compounds above which are represented by G in the general formula after the removal of hydroxyl groups, a monofunctional alcohol can be used with tri- or higher functional isocyanates or for the modification of the starting materials obtained from the above-mentioned hydroxy compounds. Any suitable monohydric alcohols of the general formula R—OH in which R represents a linear, branched, saturated, or unsaturated alkyl-, cycloalkyl-, aralkyl- or aryl group which may also contain hetero atoms or bear substituents may be used, such as, for example, ethyl alcohol, 2-methylbutanol-(4), allyl alcohol, octaden-9-ol-(1), fatty alcohols with 12 to 20 C-atoms, propargyl alcohol, hexenediol monomethyl ether, glycol monoacetate, cyclohexanol, benzyl alcohol, phenyl ethyl alcohol, cinnamic alcohol, phenol, cresols, xylenols or p-allyl phenol. Furthermore, monofunctional alcohols obtained by the addition of one or more mols of an alkylene oxide such as ethylene oxide, propylene oxide, 1,2- or 2,3-butylene oxide, epichlorohydrin or styrene oxide to the above-mentioned alcohols or to mercaptans, monocarboxylic acids, carboxylic acid amides, secondary aliphatic, araliphatic or aromatic amines or sulphonamides may be used.

Monofunctional and/or polyfunctional isocyanates may be used for the preparation of the starting materials but since reaction components containing at least two isocyanate groups are required as starting materials for the process of the invention, monofunctional isocyanates can only be used for modification. For example, from 1 mol of a trifunctional hydroxyl component and 1 mol of a monofunctional isocyanate a bifunctional hydroxyl component containing a urethane group is produced, which after further reaction with polyisocyanates can be used as starting material for the reaction with 1,2-alkyleneimines. It is obvious that by this method valuable modifications can be achieved according to the nature of the radical R in the monofunctional isocyanate R—NCO.

Any suitable isocyanates for use in the invention may be used, such as, for example, methyl isocyanate, ethyl isocyanate, allyl isocyanate, n-butyl isocyanate, tertiary butyl isocyanate, dodecyl isocyanate, octadecyl isocyanate, oleyl isocyanate, cyclohexyl isocyanate, 1-chlorohexyl isocyanate, and 1-cyano-3-propyl-isocyanate. In addition, isocyanato-ethyl acetate, isocyanato-caproic ester, ethyl-ether-propyl isocyanate, n-butyl glycol ether-propyl isocyanate, phenyl isocyanate, o-, m- and p-toluyl isocyanate, benzyl isocyanate, phenylethyl-diphenyl-methane-4-isocyanate, 3,4,6-trichlorophenyl isocyanate, nitrophenyl isocyanate, chlorophenyl isocyanate or m-cyanophenyl isocyanate may also be used, as may be isocyanates of naphthalene or multinuclear ring systems such as 1- or 2-naphthyl- or phenanthryl-3-isocyanate.

The following are examples of suitable polyisocyanates which may be used either alone or mixed with other such compounds in any way desired: aliphatic diisocyanates of the general formula OCN—R—NCO, in which R is the residue remaining after the removal of two NCO groups and represents a linear or branched, saturated or unsaturated alkylene radical and which may also contain the carbon skeleton hetero atoms such as oxygen or sulphur, for example, tetra- or hexamethylene diisocyanate, butene diisocyanate, thiodiethyl- or thiodipropyl-diisocyanate, 2,2-dimethylpentane diisocyanate, w,w'-dipropyl-ether diisocyanate and 1,4-butylene glycoldipropyl ether-diisocyanate, aliphatic diisocyanates containing ring systems, such as w,w'-diisocyanate-1,3-dimethylbenzene, w,w'-diisocyanate - 1,4-dimethyl-cyclohexane, w,w'-diisocyanate-1,4-diethylbenzene; hydroaromatic diisocyanates such as cyclohexane - 1,3- or cyclohexane-1,4-diisocyanate, 1-methylcyclohexane-2,4-diisocyanate, dicyclohexylmethine-4,4'-diisocyanate, dicyclohexyl-dimethylmethane-4,4' - diisocyanate, dicyclohexyldimethylmethane-4,4'-diisocyanate or 2, 2' - dimethyl-dicyclohexylmethine-4,4'-diisocyanate; aromatic, aliphatic or aromatic-hydroaromatic diisocyanates such as 4-phenyl-isocyanate-b-ethylisocyanate, hexahydrodiphenyl-4,4'- or hexahydrodiphenylmethane-4,4' - diisocyanate, 3-phenylisocyanate-a-ethylisocyanate: diisocyanates of benzene and its homologues, such as 1,3- or 1,4-phenylene diisocyanate, 1-alkyl-benzene-2,4-, -2,6-, -2,5-, -3,5-diisocyanates, especially toluylene-2,4- or -2,6-diisocyanate, mixtures of the two isomers, e.g., in the ratio of 65:35 or 80:20, 1-methyl-3,5-diethylbenzene-2,4-diisocyanate, diisopropylbenzene-diisocyanate: diisocyanates of substitution products of benzene, such as 1-chlorobenzene-2,4 - diisocyanate, dichlorobenzenediisocyanates, 1-nitrobenzene-2,4-diisocyanate, 1-methoxybenzene-2,4-diisocyanate, azobenzene-4,4'-diisocyanate, diphenylether-4,4'-diisocyanate and diisocyanates of naphthalene such as naphthalene-1,4-, -1,5-, -2,6-diisocyanate as well as diisocyanate derivatives of diphenyl or of diphenylmethane, e.g., diphenyldiisocyanate, 3,3'-dimethyldiphenyl-4,4'-diisocyanate, diphenylmethane-4,4'-diisocyanate, diphenyldimethylmethanediisocyanates or benzophenone-3,3' - diisocyanate.

In addition, one may use diisocyanates of multinuclear ring systems, aromatic diisocyanates containing sulphur, tri- and tetraisocyanates such as 1-methylbenzene-2,4,6-triisocyanate, triphenylmethane-4,4',4''-triisocyanate.

Higher molecular weight polyisocyanates which contain urethane groups, such as a triisocyanate obtained by reacting one mole of trimethylolpropane with 3 mols of toluylene-2,4-diisocyanate, which triisocyanate has an NCO content of 19.2%, isocyanates or isocyanate combinations partially produced by a perhydrotriazine ring cyclization, e.g., in accordance with German Patent 951,166, are also suitable for the invention.

To prepare the starting materials which contain isocyanate groups, the isocyanates are always added to the reaction mixture in a quantity in excess of the reactive H-atoms. The ratio of NCO/H active is always greater than 1 and as a rule equal to 2 so that when all the reactive H atoms have undergone reaction, addition products containing free NCO groups are obtained.

The reaction itself is usually carried out at moderately elevated temperatures, i.e., about 50 to 150° C. The end of the reaction can easily be determined by titration by known methods.

It is frequently advisable to include a solvent, e.g., for reacting solid substances. The solvents should be free from water and not contain any H-atoms capable of reacting with isocyanate. Examples of suitable solvents are acetone, ethyl acetate, butyl acetate, glycol monoethyl ether acetate, halogenated aliphatic or aromatic, saturated or unsturated hydrocarbons.

Occasionally, it is also advisable to use accelerators for the production of intermediate products containing isocyanate groups. Suitable accelerators (for this purpose) are already known compounds and are usually tertiary amines.

For the process according to the invention there may be used 1,2-alkylene imines of the following general formula:

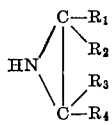

in which $R_1$, $R_2$, $R_3$ and $R_4$ represent H, alkyl, phenyl, or aralkyl.

The following are examples of suitable compounds: ethylene imine, 2-methyl-ethyleneimine, 2-ethyl-ethyleneimine, 2,2-dimethylethyleneimine, 2,3-dimethyl-, 2,2,3-trimethyl-, 2,2 - dimethyl-3-n-propylethyleneimine, 1,2-iminocyclohexane, 2-phenyl-ethyleneimine, 2,3-diphenylethyleneimine, 2-ethyl-2-phenyl-ethyleneimine, 2-ethyl-2-phenyl-2-methylethyleneimine or 2-propyl-2-phenyl-ethylene imine. The reaction, which takes place exothermically, is as a rule carried out at temperatures below 30° C. with necessary cooling, and it is frequently advantageous to include solvents of the type already mentioned above for use as diluents. The quantity of 1,2-alkyleneimine to be used can be calculated from the NCO content of the starting material which contains isocyanate groups. As a rule, one mol of 1,2-alkyleneimine is used per NCO group so that all the NCO groups in the N,N-ethyleneurea groups react.

The poly-N,N-alkylene ureas obtained by this method are then reacted according to the invention with ammonia, low molecular weight amines or low molecular weight hydrazines.

Suitable low molecular weight amines are compounds of the general formula $H_2N$—$R_5$, in which $R_5$ represents an organic radical, such as alkyl-, aryl-, aralkyl-, cycloalkyl-, cycloalkenyl groups, cycloalkanes substituted with hetero atoms, or aryl radicals which may bear halogen-, oxyalkyl radicals, hydroxyalkyl radicals, cyano groups, nitro groups, alkyl radicals, carbonamide or sulphonamide groups.

Suitable hydrazines are, for example, compounds of the general formula $H_2N$—$NH$—$R_6$ in which $R_6$ has the same meaning as $R_5$.

The following are examples of these compounds: ammonia, methylamine, ethylamine, propylamine, isopropylamine, butylamine, isobutylamine, pentylamine, hexylamine, dodecylamine, cyclohexylamine, benzylamine, allylamine, aniline, 2-, 3- or 4-aminotoluene, chloroaminotoluene, o-, m- and p-xylidine, a-phenylethylamine, b-phenylethylamine, mesidine, 2-amino-1,3-diethylbenzene, 3-aminobenzenesulphonic acid amide, 1-amino-2-acetanilide, 2-, 3- or 4-aminoanisole, amino-ethoxybenzene, a- or b-naphthylamine or also hydrazine, methylhydrazine, N-N-dimethylhydrazine, ethylhydrazine or phenylhydrazine.

This stage of the process can be carried out by adding one of the above-mentioned amines or hydrazines or ammonia in such quantity to the poly-N,N-alkylene urea that the amine and the alkylene iminourea groups are present in at least equivalent quantities. The amine or hydrazine may also be used in an excess, up to about ten times the equivalent quantity. An excess is preferred.

This mixture is heated to 80 to 150° C., preferably 120 to 149° C., for ½ to 5 hours, occasionally under pressure if highly volatile amines such as ammonia, methylamine, dimethylamine, hydrazine or alkyl hydrazines are used. When any excess amine present and/or any solvent present has been removed by the usual methods, the product of the process according to the invention is obtained in a practically quantitative yield in a satisfactory state of purity.

It is also possible to dissolve the poly-N,N-alkylene urea in an organic solvent and to add the amine or hydrazine to this solution. The following are examples of suitable solvents: acetonitrile, benzene, petroleum ether, tetrahydrofuran, dioxane, toluene, xylene, chlorobenzene, nitrobenzene, ethylene glycol acetate and ethylene glycol dimethylether.

It is to be considered surprising that this reaction can be carried out so smoothly, since one would expect amidation of the urethane groups to take place at the high reaction temperature employed. This side reaction does not take place. Polymerization of N,N-alkyleneaminourea would also be expected under the given conditions. This reaction also was surprisingly found not to take place.

The products according to the invention are pale yellow to dark brown, highly viscous substances which have a high tendency to crystallization and melting points below 100° C. They are soluble in dimethylformamide and most of the above-mentioned organic solvents.

The products of the process are valuable starting materials for the production of elastomers by the diisocyanate polyaddition process and are particularly suitable for the production of highly elastic fibers and films. Valuable synthetic resins were also obtained by the spray process. Other commercially interesting products that can be obtained by the process are lacquer components produced by reaction with diisocyanates and epoxides of the products of the process. If the products of the invention contain olefinically unsaturated groups (for example when allylamine is used as the amine for the ring opening reaction), the material can also be crosslinked by means of peroxides or by the usual method of diisocyanate prelenthening.

The invention is further illustrated but not limited by the following examples in which parts are by weight unless otherwise specified.

Example 1

After half an hour's dehydration, about 505 parts of hexamethylenediisocyanate are added to about 535 parts of polybutylene glycol ether (0.50 mol) and the reaction mixture is stirred for about two hours at 100 to 105° C. The excess isocyanate is removed in a rotary evaporator at a bath temperature of about 135° C. in a high vacuum. A viscous liquid polyether diisocyanate (prelengthened diisocyanate) which has an NCO content of 6.09% (calculated: 5.97%) remains behind and is dissolved in 250 parts by volume of toluene. At 8 to 10° C. about 43.2 parts of distilled ethylene imine in 150 parts by volume liters of toluene are added, the mixture is stirred at room temperature for about two hours, and about 85 parts ammonia are then added in an autoclave. After about 90 minutes at 120 to 135° C., the pressure is released, ammonia and solvent are removed in a water jet vacuum, and a 97.5% yield of a pale yellow, waxy product is obtained which is equivalent to 12.80 ml. N/10 HCl/g. of substance (calculated: 13.10 ml./g.) in an 80% mixture of methanol in water. The product is soluble in hot acetone, tetrahydrofuran and dimethylformamide.

Example 2

A prelengthened diisocyanate having an NCO content of 3.66% (calculated: 3.42%) is prepared as in Example 1 from about 530 parts of polybutylene glycol ether (0.25 mol) and 420 parts hexamethylenediisocyanate, and is dissolved in a 4 parts by volume of dry chlorobenzene. About 22.0 parts of ethyleneimine dissolved in about 100 parts by volume chlorobenzene are then added dropwise at about 10° C. and the mixture is stirred for one hour at room temperature. The reaction mixture is then heated in an autoclave to 130–135° C. for about 2½ hours with about 100 parts methylamine, the methylamine excess and the solvent are removed and a 96% theoretical yield of a pale yellow, waxy material is obtained which has an amino equivalent of 7.60 ml. N/10 $HClO_3$/g. substance (calculated: 7.65 ml./g.).

Example 3

In a manner analogous to that used in Example 1, a prelengthened diisocyanate having an NCO content of 6.67% (calculated: 6.74%) is prepared from about 500 parts of dehydrated polybutylene glycol ether (0.55 mol) and about 740 parts of hexamethylene diisocyanate, and is dissolved in about 500 parts by volume of dry o-dichlorobenzene, about 47.5 parts of ethyleneimine in about 200 parts by volume of a-dichlorobenzene are then added at about 10° C. and the reaction mixture is then stirred for about one hour, after which about 240 parts of 99.5% hydrazine hydrate are added, and the reaction mixture is heated in an autoclave for about three hours at 125 to 130° C. (2.5 excess atmospheres). Hydrazine, water and solvent are removed in a water jet vacuum. The pale red residue was produced as a 96% theoretical yield after drying in a high vacuum at a bath temperature of 125° C., and it has an amino equivalent of 16.2 ml. N/10 $HClO_4$/g. substance (calculated: 14.20 ml./g.).

Example 4

About 495 parts of polybutylene glycol ether (0.30 mol) and about 520 parts of toluylene diisocyanate yield, after one hour's heating at 100 to 105° C. and working up by the methods described in Example 1, a prelengthened diisocyanate having a 3.96% NCO content (calculated: 4.20%). This was taken up in 400 parts by volume of dry toluene and about 26.6 parts of ethylene imine in about 100 parts by volume of toluene are added at about 10° C. The mixture is kept at room temperature for about one hour, and after the addition of about 56 parts of methylamine the reaction product is compressed for about 2½ hours at 130 to 135° C. The pale yellow, waxy reaction product freed from solvent and amine has an amino equivalent of 8.65 ml. N/10 HCl/g. of substance (calculated: 8.0 ml. N/10 HCl/g). Yield over 91% of theoretical.

Example 5

A polyether diisocyanate having an NCO content of 4.37% (calculated: 4.65%) is prepared according to the method described in Example 1 from about 730 parts of polybutylene glycol ether (0.50 mol.) and about 435 parts toluylene diisocyanate, and this polyether diisocyanate is dissolved in 300 parts by volume of dry acetone. About 43.0 parts of distilled ethylene imine in about 200 parts by volume of acetone are added at 5–10° C. and the mixture stirred for about one hour at about 20° C. after which the acetone is distilled off in a water jet vacuum. After the addition of about 450 parts of aniline and heating for about 4 hours at 135–138° C. the excess aniline is removed in a thin layer evaporator at 130° C./HV, and a brown, highly viscous, clear product is obtained. Amine equivalent: 9.20 ml. N/10 perchloric acid/g. of substance (calculated: 9.13 ml./g.) Yield 99.2% of theoretical.

Example 6

A prelengthened diisocyanate of NCO content 4.40% (calculated: 4.37%) is prepared from about 800 parts polybutylene glycol ether (0.50 mol.) and about 400 parts 1,4-phenylene diisocyanate as described in Example 1 and is dissolved in about 400 parts by volume of dry acetone. About 43.5 parts of ethylene imine in about 200 parts by volume of acetone are added at a temperature below 10° C. and the reaction mixture is then kept at room temperature for about one hour. After removal of the solvent in a water jet vacuum, about 400 parts of aniline are added, the mixture is heated to 135–138° C. for about 4 hours, and unreacted aniline is removed in a thin layer evaporator at about 130° C. in a high vacuum. The brown, viscous liquid reaction product has an amino equivalent of 9.55 ml. N/10 perchloric acid/g. of substance (calculated: 9.16 ml./g.). Yield: 96% of theoretical.

Example 7

The "prelengthened diisocyanate" obtainable from about 213 parts of polybutylene glycol ether (0.10 mol.) and about 150 parts of hexamethylene diisocylanate has an NCO content of 3.47% (calculated: 3.41%). After it has been dissolved in about 300 parts by volume of dry acetone, about 8.7 parts of ethylene imine dissolved in about 100 parts by volume of acetone are added at room temperature, the mixture is stirred for about one hour, and the acetone is then removed in vacuo. The pale yellow residue is heated with about 170 parts of o-toluidine for about 5 hours at about 140° C., dissolved in about 50 parts by volume of o-dichlorobenzene and distilled in a thin layer evaporator. The product which is waxy when cold softens at 60 to 70° C. and has an amino equivalent of 7.12 ml. N/10 $NClO_4$/g. substance (calculated: 7.35 ml./g.). Yield 93% of theoretical.

Example 8

An intermediate compound stage which has an NCO content of 4.00% (calculated 4.20%) is prepared in known manner from 165 parts of polybutylene glycol ether (0.10 mol.) and about 155 parts of 2,6-toluene diisocyanate and is dissolved in about 200 parts by volume of toluene, about 8.6 parts of ethylene imine dissolved in about 50 parts by volume of toluene are added at about 10° C. and about 125 parts of o-anisidine are added after about one hour, and the mixture is heated for about 5 hours at 135–140° C. After thin layer distillation at about 130° C. in HV, about 234 parts (96% of theoretical) of a pale yellow product is obtained which has an amino equivalent of 7.95 ml. N/10 $HClO_4$/g. substance (calculated: 8.15 ml./g.).

Example 9

A "prelengthened diisocyanate' is prepared by reacting about 250 parts of polypropylene glycol ether (molecular weight 1000) with about 260 parts of toluylene-2,4-diisocyanate for up to about 2 hours at about 100° C., and the excess toluylene diisocyanate is removed from this prelengthened diisocyanate at about 130° C. in a high vacuum; NCO content 6.19% (calculated: 6.22%). After dissolving in 500 parts by volume of chlorobenzene, about 2.16 parts of distilled ethylene imine dissolved in 100 parts by volume of chlorobenzene are added at about 10° C. and the mixture is stirred for about one hour after which about 240 parts of aniline are added. After about 4 hours at 135–140° C. the solvent and excess amine are removed in a thin layer evaporator at 120° C./HV, and a viscous, pale brown product is obtained which has an amino equivalent of 11.70 ml. N/10 perchloric acid/g. of substance (calculated 12.25 ml./g.). Yield: 94% of theoretical.

Example 10

As in Example 7, a "prelengthened diisocyanate," having an NCO content of 3.61% (calculated 3.59%) is obtained from about 500 parts of polypropylene glycol ether (molecular weight 2000) and about 260 parts of toluylene-2,4-diisocyanate. It is dissolved in about 800 parts by volume of dry xylene, about 21.8 parts of ethyleneimine in about 200 parts by volume of xylene are added, and the mixture stirred for about one hour and then treated with about 240 parts of aniline. After boiling for about 4½ hours at about 140° C. the product is worked up as in Example 7. The pale yellow, viscous liquid product has an amino equivalent of 7.65 ml./N/10 $HClO_4$/g. of substance (calculated: 7.70 ml. $HClO_4$/g.) and is obtained in a yield which is 95.8% of the theoretical.

What is claimed is:

1. As a new composition matter a polymeric polyamine having the general formula $$G-\left[\begin{array}{c}O\ H\\ \|\ |\\ C-N-R\end{array}\left(\begin{array}{cccccc}H&O&H&R_2&R_3&H\\ |&\|&|&|&|&|\\ -N-C-N-C-C-N-R_5\\ &&&|&|\\ &&&R_1&R_4\end{array}\right)_m\right]_n$$

wherein G is the residue remaining after the removal of the hydrogen atoms from the hydroxyl groups of a monohydric or polyhydric alcohol, $n$ is an integer equal to the number of hydrogen atoms removed from the hydroxyl groups of G, R is the residue remaining after the removal of at least two isocyanato groups from an organic polyisocyanate, $m$ is an integer equal to the number of isocyanate groups removed from R, $R_1$, $R_2$, $R_3$ and $R_4$ are hydrogen, alkyl, phenyl, or aralkyl and $R_5$ is hydrogen, a monovalent organic radical or a radical having the formula $$-N\begin{array}{c}R_6\\ \diagup\\ \diagdown\\ R_6\end{array}$$

where $R_6$ is hydrogen or a monovalent organic radical.

2. The composition of claim 1 wherein $n$ is an integer of at least 2 and G is the residue remaining after the removal of at least 2 hydroxyl groups from a polyhydric alcohol.

3. A process for the preparation of polymeric polyamines of claim 1 which comprises reacting a 1,2-alkylene imine with an NCO containing polymeric compound prepared by reacting a polyhydric alcohol with an excess of an organic polyisocyanate and reacting the product thus formed with at least an equivalent quantity of ammonia, an organic monoamine, or a hydrazine.

4. The process of claim 3 wherein the ammonia, with an orgnic monoamine or hydrazine is used in a large excess.

5. The process of claim 3 wherein the reaction product of the polymeric compound containing NCO groups and a 1,2-alkylene imine with ammonia, an organic monoamine, or a hydrazine is reacted in an inert solvent.

6. A process for preparing a polymeric polyamine having a melting point below about 100° C. comprising the steps of:

(A) preparing a prepolymer containing free —NCO groups by reacting at a temperature between about 50° C. and about 150° C.;
  (i) a polyol having a molecular weight between about 400 and about 6,000 with
  (ii) at least an equivalent amount, based on the amount of said polyol, of an organic polyisocyanate;

(B) thereafter preparing a polymer by reacting at a temperature below about 30° C.;
  (i) a 1,2-alkylene imine having the formula:

$$HN\begin{array}{c}C-R_1\\ \diagup\ \diagdown R_2\\ \ \ \ \ |\\ \ \ \ \ \ R_3\\ \diagdown\ \diagup\\ C-R_4\end{array}$$

wherein $R_1$, $R_2$, $R_3$ and $R_4$ are selected from the group consisting of hydrogen, alkyl radicals, phenyl radicals, and aralkyl radicals, with
  (ii) the prepolymer prepared in step (A), the ratio of said imine to said prepolymer being such that there is at least one mol of imine for each free —NCO group on said prepolymer;

(C) thereafter mixing together and reacting at a temperature between 80° C. and 150° C.:
  (i) the polymer prepared in step (B) with
  (ii) at least an equivalent amount of a member selected from the group consisting of:
    (a) ammonia,
    (b) a low molecular weight amine having the formula:

$$R_5-NH_2$$

wherein $R_5$ is selected from the group consisting of alkyl, aralkyl, cycloalkyl, aryl, and aryl radicals substituted with a member selected from the group consisting of halogen, alkyl radicals, carbonamide groups, and sulphonamide groups, and
    (c) low molecular weight hydrazines having the formula:

$$R_6-NH-NH_2$$

wherein $R_6$ is selected from the group consisting of hydrogen, alkyl and aryl.

References Cited

UNITED STATES PATENTS

| 2,888,439 | 5/1959 | Simons | 260—77.5 |
| 3,054,757 | 9/1962 | Britain | 260—2.5 |
| 3,146,219 | 8/1964 | Beitchman | 260—75 |
| 3,361,844 | 1/1968 | Hoeschele | 260—858 |

FOREIGN PATENTS

| 612,937 | 1/1961 | Canada. |
| 919,861 | 6/1959 | Great Britain. |
| 1,153,161 | 8/1963 | Germany. |

DONALD E. CZAJA, Primary Examiner

M. J. WELSH, Assistant Examiner

U.S. Cl. X.R.

260—47